(12) United States Patent
Jakubiak et al.

(10) Patent No.: US 11,004,223 B2
(45) Date of Patent: May 11, 2021

(54) METHOD AND DEVICE FOR OBTAINING IMAGE, AND RECORDING MEDIUM THEREOF

(71) Applicant: Samsung Electronics Co., Ltd., Gyeonggi-do (KR)

(72) Inventors: Antoni Jakubiak, Grojec (PL); Marcin Bogucki, Warsaw (PL); Michal Szolucha, Warsaw (PL); Michal Wengierow, Warsaw (PL); Pawel Kies, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/650,758

(22) Filed: Jul. 14, 2017

(65) Prior Publication Data
US 2018/0018786 A1 Jan. 18, 2018

(30) Foreign Application Priority Data

Jul. 15, 2016 (KR) .......................... 10-2016-0090268

(51) Int. Cl.
*G06T 15/20* (2011.01)
*G01B 11/25* (2006.01)
(Continued)

(52) U.S. Cl.
CPC ................ *G06T 7/55* (2017.01); *G01B 11/25* (2013.01); *G06T 3/4053* (2013.01); *G06T 5/50* (2013.01);
(Continued)

(58) Field of Classification Search
CPC ......... G06T 7/55; G06T 7/521; G06T 3/4053; G06T 5/50; G06T 15/205; G06T 7/11;
(Continued)

(56) References Cited

U.S. PATENT DOCUMENTS 8,090,194 B2 1/2012 Golrdon et al.
8,208,719 B2 6/2012 Gordon et al.
(Continued)

FOREIGN PATENT DOCUMENTS

WO 2014177750 A1 11/2014

OTHER PUBLICATIONS

Zhang et al.; "High dynamic range scanning technique,"; Opt. Eng. 48(3) 033604; Mar. 1, 2009; 9 pages.
(Continued)

*Primary Examiner* — John W Lee

(57) ABSTRACT

A device for obtaining an image includes a projector configured to project light having a preset pattern to an object, a first camera configured to sense light reflected and fed back by the object to obtain a depth image, a second camera configured to obtain a color image of the object, a motion sensor configured to sense a motion of the device. The device also includes and a processor configured to obtain a color image and a plurality of depth images of the object, by changing a parameter about the projected light and the light sensed by the first camera. When the motion of the device is less than a threshold, the processor is configured to merge pieces of depth information respectively obtained from the plurality of depth images with each other, and obtain a 3D image of the object, based on the merged depth information and the color image.

12 Claims, 20 Drawing Sheets

(51) Int. Cl.
  *G06T 7/55* (2017.01)
  *G06T 3/40* (2006.01)
  *G06T 7/521* (2017.01)
  *G06T 5/50* (2006.01)
  *G06T 7/215* (2017.01)
  *G06T 7/11* (2017.01)

(52) U.S. Cl.
  CPC ............... *G06T 7/11* (2017.01); *G06T 7/215* (2017.01); *G06T 7/521* (2017.01); *G06T 15/205* (2013.01); *G06T 2207/10016* (2013.01); *G06T 2207/10028* (2013.01); *G06T 2210/56* (2013.01)

(58) Field of Classification Search
  CPC ........... G06T 7/215; G06T 2207/10016; G06T 2210/56; G06T 2207/10028; G01B 11/25
  See application file for complete search history.

(56) References Cited

U.S. PATENT DOCUMENTS

| | | | |
|---|---|---|---|
| 8,643,701 B2 | 2/2014 | Nguyen et al. | |
| 8,711,206 B2* | 4/2014 | Newcombe | G06T 7/20 348/46 |
| 8,983,177 B2 | 3/2015 | Tuzel et al. | |
| 2009/0322745 A1 | 12/2009 | Zhang et al. | |
| 2012/0007996 A1 | 1/2012 | Bilcu | |
| 2012/0056982 A1 | 3/2012 | Katz et al. | |
| 2012/0162390 A1 | 6/2012 | Chang et al. | |
| 2012/0194644 A1* | 8/2012 | Newcombe | G06T 7/20 348/46 |
| 2012/0269458 A1 | 10/2012 | Graziosi et al. | |
| 2012/0294510 A1 | 11/2012 | Zhang et al. | |
| 2013/0329087 A1 | 12/2013 | Tico et al. | |
| 2014/0104394 A1 | 4/2014 | Yanai et al. | |
| 2014/0132722 A1 | 5/2014 | Martinez Bauza et al. | |
| 2014/0139639 A1 | 5/2014 | Wagner et al. | |
| 2014/0160123 A1 | 6/2014 | Yang et al. | |
| 2014/0240469 A1 | 8/2014 | Lee | |
| 2015/0002636 A1 | 1/2015 | Brown | |
| 2015/0016713 A1* | 1/2015 | Mori | G06T 7/579 382/154 |
| 2015/0237325 A1* | 8/2015 | Angot | G06T 7/579 348/47 |
| 2015/0294499 A1 | 10/2015 | Wagner et al. | |
| 2015/0350513 A1 | 12/2015 | Zhang et al. | |
| 2016/0088225 A1 | 3/2016 | Barron et al. | |

OTHER PUBLICATIONS

Diprose, L.; "Circle of Confusion Explained and What it Means to Be in Focus"; Fuji Film Photography Blog; Jan. 8, 2015; http://www.fujifilm.com.au/blogs/digital-photography/circle-of-confusion-and-what-it-means-to-be-in-focus; 6 pages.

Zhang et al.; "Camera Calibration and 3D Reconstruction"; 2008; http://docs.opencv.org/2.4/modules/calib3d/doc/camera_calibration_and_3d_reconstruction.html; 31 pages.

ISA/KR, "International Search Report," International Application No. PCT/KR2017/007626, dated Oct. 25, 2017, 12 pages.

European Patent Office, "Supplementary European Search Report," Application No. EP178280152, dated Jul. 2, 2019, 9 pages.

* cited by examiner

METHOD AND DEVICE FOR OBTAINING IMAGE, AND RECORDING MEDIUM THEREOF

CROSS-REFERENCE TO RELATED APPLICATION

This application is related to and claims priority to Korean Patent Application No. 10-2016-0090268 filed on Jul. 15, 2016, the contents of which are incorporated herein by reference.

TECHNICAL FIELD

The present disclosure relates to a device and method of obtaining an image, and a recording medium having recorded thereon a program for executing the method of obtaining an image.

BACKGROUND

With information technology (IT) development, devices recognize an operation of a user or movement of an object, interpret the recognized operation or movement as an input signal, and operate in correspondence with the input signal. Accordingly, devices have to extract three-dimensional (3D) information about the operation of the user or the movement of the object by using a camera.

When the devices are controlled, the necessity for depth information, which is 3D information, increases, and research into various techniques for extracting 3D information has recently been actively conducted. For example, a technique of projecting light having a specific pattern to an object and sensing a variation in the pattern of light reflected and fed back by the object to thereby obtain depth information of the object is being developed. However, compared with color images, the depth information still has low resolution, leading to degradation of the quality of 3D images.

SUMMARY

To address the above-discussed deficiencies, it is a primary object to provide a method and device for obtaining an image by using depth information obtained from a plurality of different depth images in order to increase the resolution of depth information of an object that is used to obtain a three-dimensional (3D) image, and a recording medium having recorded thereon a program for executing the method of obtaining an image.

Additional aspects will be set forth in part in the description which follows and, in part, will be apparent from the description, or may be learned by practice of the presented embodiments.

According to an aspect of an embodiment, a device for obtaining an image, the device includes a projector configured to project light having a preset pattern to an object; a first camera configured to sense light reflected and fed back by the object to obtain a depth image; a second camera configured to obtain a color image of the object; a motion sensor configured to sense a motion of the device; and a processor configured to obtain a plurality of depth images of the object by changing at least one of parameters about the light projected by the projector and the light sensed by the first camera, and, when the sensed motion of the device is less than a threshold, merge pieces of depth information respectively obtained from the plurality of depth images with each other, and obtain a 3D image of the object, based on the merged depth information and the obtained color image.

The processor may obtain the plurality of depth images of the object by changing at least one of an intensity with which the light is projected, a time period during which the light is projected, a time period during which the reflected and fed-back light is sensed, and a sensitivity with which the reflected and fed-back light is sensed.

The processor may select depth images obtained when the sensed motion of the device is less than the threshold from among the plurality of depth images, and only merges pieces of depth information of the selected depth images with each other.

When the sensed motion of the device is equal to or greater than the threshold, the first camera may re-obtain a depth image of the object.

When the sensed motion of the device is equal to or greater than the threshold, the processor may merge the respective pieces of depth information of the plurality of depth images with each other, based on motion information of the device representing the motion sensed by the motion sensor.

The processor may determine respective depth values of a plurality of pixels included in the obtained color image, based on the merged depth information.

The processor may determine a depth value of a first pixel of which a depth value has not yet been determined from among the plurality of pixels included in the obtained color image, based on depth values of pixels adjacent to the first pixel.

The processor may blur at least a portion of the 3D image of the object, based on the merged depth information and preset focus information.

The processor may detect a region corresponding to a preset distance range from the device from the 3D image of the object, based on the merged depth information.

According to an aspect of an embodiment, a method of obtaining an image in a device includes changing at least one of parameters about light having a preset pattern and projected onto an object and light reflected and fed back by the object to obtain a plurality of depth images of the object; merging pieces of depth information respectively obtained from the obtained plurality of depth images with each other, when a motion of the device is less than a threshold; and obtaining a 3D image of the object, based on the merged depth information and a color image of the object.

The obtaining of the plurality of depth images may include obtaining the plurality of depth images of the object by changing at least one of an intensity with which the light is projected, a time period during which the light is projected, a time period during which the reflected and fed-back light is sensed, and a sensitivity with which the reflected and fed-back light is sensed.

The method may further include selecting depth images obtained when the sensed motion of the device is less than the threshold, from among the plurality of depth images, wherein the merging includes merging respective pieces of depth information of the selected depth images with each other.

The method may further include re-obtaining a depth image of the object, when the sensed motion of the device is equal to or greater than the threshold.

The merging may include, when the sensed motion of the device is equal to or greater than the threshold, merging the respective pieces of depth information of the plurality of depth images with each other, based on motion information of the device representing the motion sensed by the motion sensor.

The obtaining of the 3D image may include determining respective depth values of a plurality of pixels included in the obtained color image, based on the merged depth information.

The determining may include determining a depth value of a first pixel of which a depth value has not yet been determined from among the plurality of pixels included in the obtained color image, based on depth values of pixels adjacent to the first pixel.

The method may further include blurring at least a portion of the 3D image of the object, based on the merged depth information and preset focus information.

The method may further include detecting a region corresponding to a preset distance range from the 3D image of the object, based on the merged depth information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
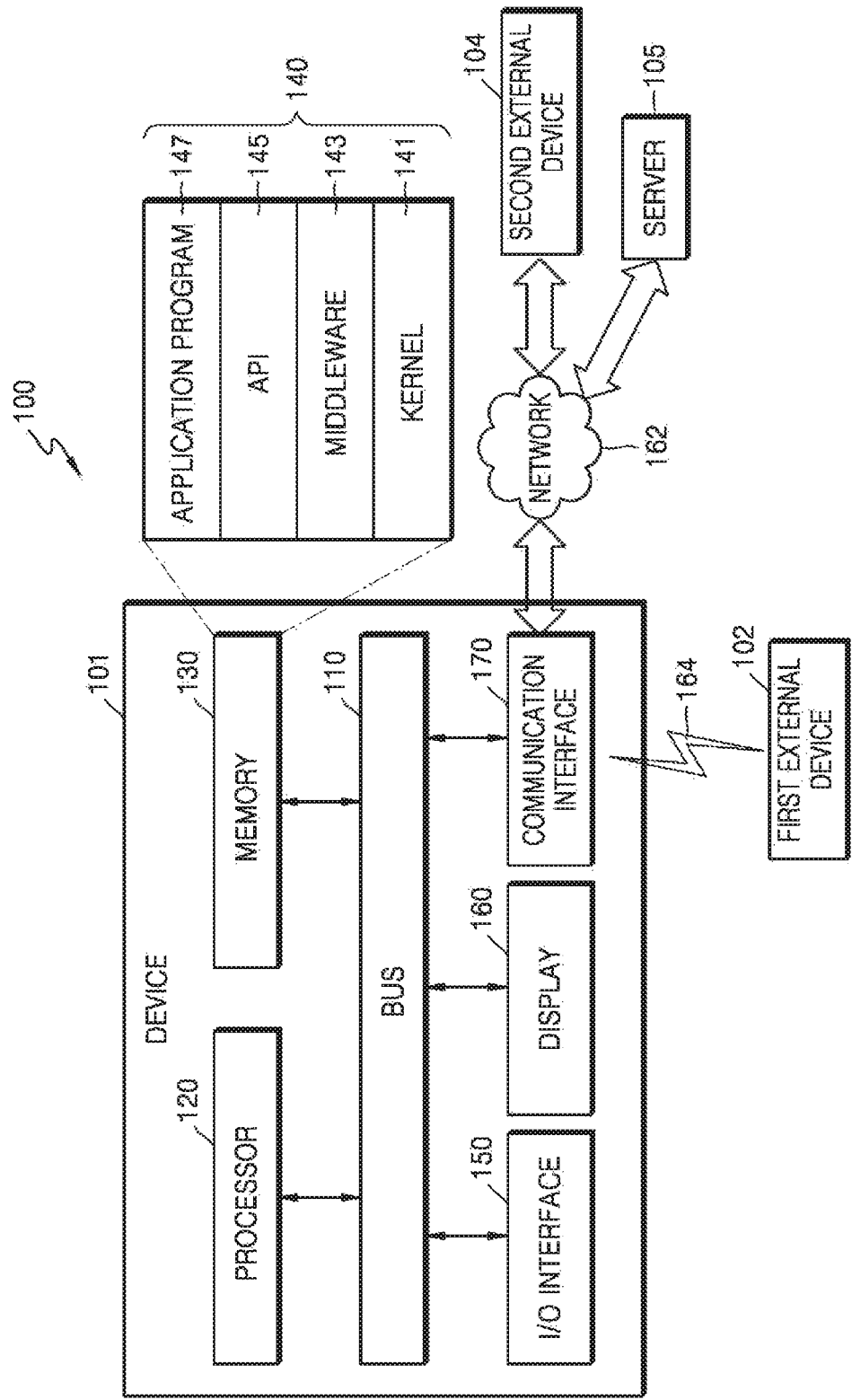
FIG. 1 illustrates a block diagram of a device in a network environment, according to various embodiments.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the present disclosure, it is to be understood that terms such as "including", "having", etc., are intended to indicate the existence of the features (for example, numbers, functions, operations, or components, such as parts), and are not intended to preclude the possibility that one or more other features may exist or may be added.

As used in the present disclosure, the terms "A or B", "at least one of A and/or B", and "one or more of A and/or B" may include any one of listed items and all of at least one combination of the items. For example, "A or B", "at least one of A and B", or "at least one of A or B" may include (1) at least one A, (2) at least one B, or (3) at least one A and at least one B.

While such terms as "first", "second", etc., may be used to describe various components, such components must not be limited to the above terms. The above terms are used only to distinguish one component from another. For example, a first user device and a second user device may indicate different user devices regardless of an order or an importance. For example, a first component discussed below could be named a second component, and similarly, a second component may be named a first component without departing from the teachings of the present disclosure.

When a component (first component) is "directly coupled with/to" or "directly connected to" the second component, the first component may be connected to the second component directly or through another component (third component). On the other hand, when the first component is "directly coupled with/to" or "directly connected to" the second component, no other component exists between the first and second components.

The expression "configured to (or set to)" used in the present disclosure may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "device configured to" may refer to a situation in which the device is "capable of" together with another device or parts. For example, the phrase "a processor configured to (or set to) perform A, B, and C" may be a dedicated processor (for example, an embedded processor) for performing A, B, and C, or a generic-purpose processor (for example, a central processing unit (CPU) or an application processor (AP)) for performing A, B, and C by executing at least one software program stored in a memory device.

The terms used in the present disclosure are merely used to describe particular example embodiments, and are not intended to limit the present disclosure. An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs. It will be further understood that terms defined in commonly used dictionaries should be interpreted as having meanings that are the same as or similar to their meaning in the context of the relevant art and will not be interpreted in an idealized or overly formal sense unless expressly so defined herein. In some case, terms defined herein cannot be interpreted to exclude embodiments of the present disclosure.

Devices according to various embodiments may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, and a wearable device, but is not limited thereto. According to various embodiments, the wearable device may include at least one of an accessory-type wearable device (for example, a watch, a ring, a bracelet, an anklet, a necklace, eyeglasses, contact lenses, or a head-mounted-device (HMD)), a fabric or clothing integrated device (for example, electronic clothing), a body-attached type wearable device (for example, a skin pad or a tattoo), and a body-implanted type wearable device (for example, an implantable circuit).

According to some embodiments, the device may be a home appliance. The home appliance may include at least one of, for example, a television (TV), a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (for example, Samsung HomeSync®), a game console, an electronic dictionary, an electronic key, a camcorder, and an electronic picture frame, but is not limited thereto.

According to other embodiments, the device may include at least one of various medical devices (for example, various portable medical measuring devices (a blood sugar measuring device, a heartbeat measuring device, a blood pressure measuring device, and a thermometer), magnetic resonance angiography (MRA), magnetic resonance imaging (MRI), computed tomography (CT), and an ultrasonic machine), a navigation device, a global navigation satellite system (GNSS), an event data recorder (EDR), a flight data recorder (FDR), a vehicle infotainment device, marine electronic equipment (for example, a marine navigation device or a gyro compass), avionics, a security device, a vehicle head unit, industrial or home robots, an automatic teller's machine (ATM), a point of sales (POS) device, and an Internet of things (IoT) device (for example, a light bulb, various sensors, an electric or gas meter, a sprinkler device, a fire alarm, a thermostat, a street lamp, a toaster, exercise equipment, a hot water tank, a heater, and a boiler), but is not limited thereto.

According to some embodiments, the device may include at least one of a part of a furniture or building/structure, an electronic board, an electronic signature receiving device, a projector, or various measuring instruments (for example, a water meter, an electricity meter, a gas meter, or a wave meter), but is not limited thereto. According to various embodiments, the device may be a combination of the above-listed devices. The device may also be a flexible device. Of course, the device is not limited to the above-listed devices and may include new devices according to new technical developments.

Devices for obtaining an image, according to various embodiments, will now be described more fully with reference to the accompanying drawings. According to the present disclosure, the term "user" may refer to a person who uses a device, or may refer to an apparatus (for example, an artificial intelligence (AI) device) that uses a device.

FIG. 1 illustrates a block diagram of a device 101 in a network environment 100, according to various embodiments.

FIG. 1 illustrates the device 101 within the network environment 100, according to various embodiments. The device 101 may include a bus 110, a processor 120, a memory 130, an input/output (I/O) interface 150, a display 160, and a communication interface 170. According to some embodiments, the device 101 may omit at least one of the above components or may additionally include another component.

The bus 110 may connect the processor 120, the memory 130, the I/O interface 150, the display 160, and the communication interface 170 to each other, and may include a circuit for transmitting and receiving information (for example, a control message and/or data) to and from the processor 120, the memory 130, the I/O interface 150, the display 160, and the communication interface 170.

The processor 120 may include at least one of a CPU, an AP, and a communication processor (CP). The processor 120 may control at least one component of the device 101 and/or execute an operation related to communication or a data process.

The memory 130 may include a volatile and/or nonvolatile memory. The memory 130 may store a command or data related to at least one component of the device 101. According to an example embodiment, the memory 130 may store software and/or a program 140.

The program 140 may include, for example, a kernel 141, middleware 143, an application programming interface (API) 145, and/or an application program (or an application) 147. At least some of the kernel 141, the middleware 143, and the API 145 may be referred to as an operating system (OS).

The I/O interface 150 may operate as an interface capable of transmitting a command or data input from a user or an external device to at least one of the components of the device 101. Also, the I/O interface 150 may output a command or data received from at least one of the components of the device 101 to the user or the other external device.

The display 160 may include a liquid crystal display (LCD), a light-emitting diode (LED) display, an organic light-emitting diode (OLED) display, a microelectromechanical systems (MEMS) display, or an electronic paper display, but is not limited thereto. The display 160 may display, for example, various types of content (for example, text, an image, a video, an icon, or a symbol) to the user. The display 160 may include a touch screen, and may receive a touch, gesture, proximity, or hovering input using an electronic pen or a part of the body of the user.

The communication interface 170 may set communication between the device 101 and an external device (for example, a first external device 102, a second external device 104, or a server 106. For example, the communication interface 170 may communicate with an external device (for example, the second external device 104 or the server 106) by being connected to a network 162 via wired communication or wireless communication.

The wireless communication may use, as a cellular communication protocol, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communication (GSM). Also, the wireless communication may include short-range communication 164. The short-range communication 164 may include at least one of wireless fidelity (WiFi), Bluetooth, near field communication (NFC), and global navigation satellite system (GNSS). The GNSS may include, according to regions or bandwidths, at least one of global positioning system (GPS), Glonass (Russian global navigation satellite system), Beidou navigation satellite system (BDS), and Galileo system (European global satellite-based navigation system). Herein, "GPS" and "GNSS" may be interchangeably used. The wired communication may include at least one of universal serial bus (USB), high definition multimedia interface (HDMI), recommended standard 232 (RS-232), and plain old telephone service (POTS). The network 162 may include at least one of telecommunications networks, such as a computer network (for example, local area network (LAN) or wide area network (WAN), the Internet, and a telephone network.

Each of the first and second external devices 102 and 104 may be of the same type as or different type than the device 101. According to an example embodiment, the server 106 may include a group of one or more servers. According to various embodiments, all or some of the operations performed by the device 101 may be performed by one or more devices (for example, the first and second external devices 102 and 104 or the server 106). According to an embodiment, when the device 101 needs to perform a function or service automatically or upon a request, the device 101 may, instead of or in addition to executing the function or the service, request another device (for example, the first or second external device 102 or 104 or the server 106) to perform at least some of related functions or services. The other device (for example, the first or second external device 102 or 104 or the server 106) may perform a requested or additional function, and transmit a result of performing the requested or additional function to the device 101. Then, the device 101 may provide the received result without changes or provide a requested function or service by additionally processing the received result. To this end, for example, cloud computing technology, distributed computing technology, or client-server computing technology may be used.

Figure 2:
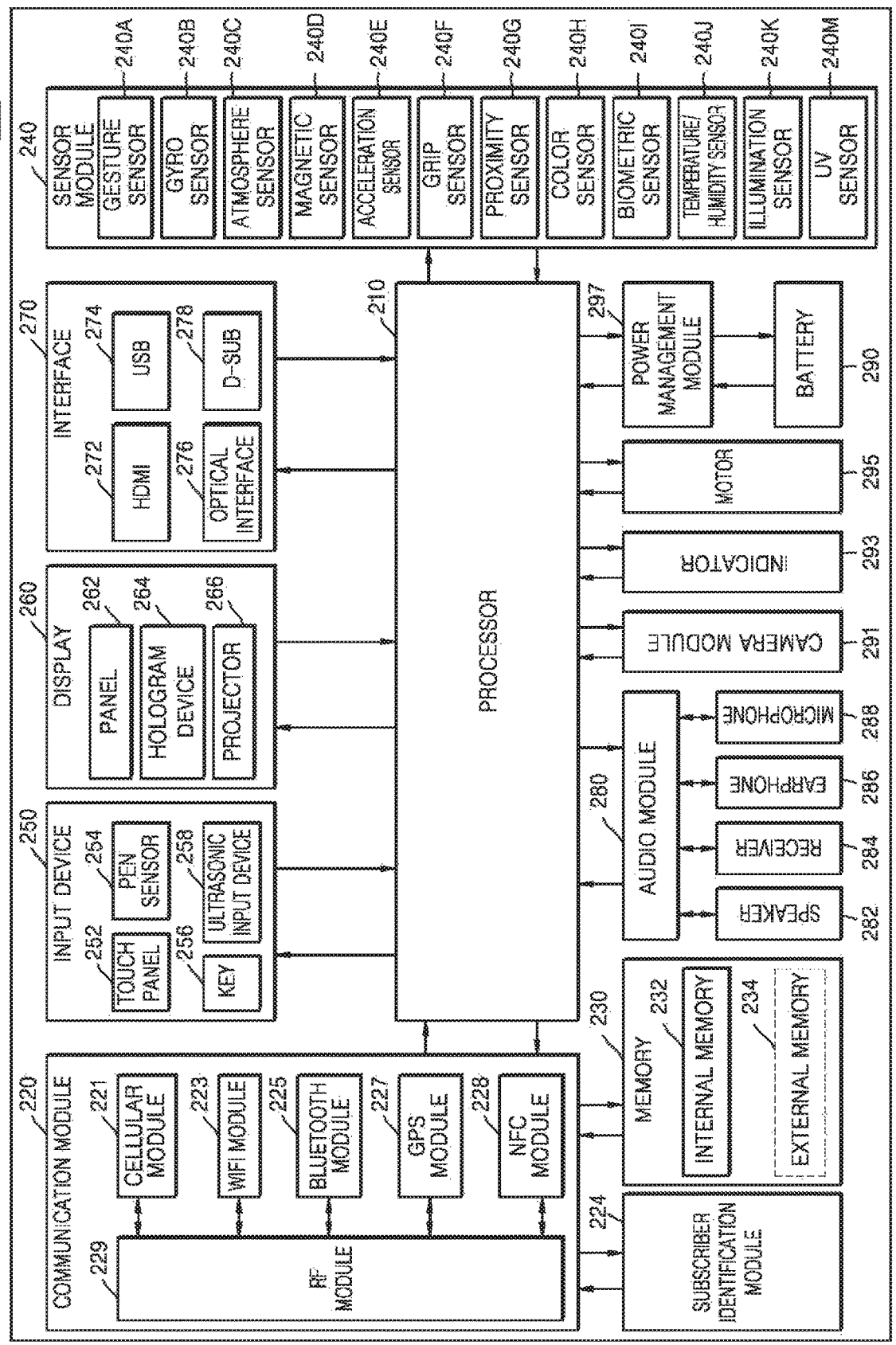
FIG. 2 illustrates a block diagram of a device for obtaining an image, according to another embodiment.

FIG. 2 illustrates a block diagram of a device 200 for obtaining an image, according to another embodiment.

The device 200 may include a processor 210, a communication module 220, a subscriber identity module (SIM) 224, a memory 230, a sensor module 240, an input device 250, a display 260, an interface 270, an audio module 280, a camera module 291, an indicator 293, a motor 295, a power management module 297, and a battery 299.

The processor 210 may drive an OS or an application program to control a plurality of hardware or software components connected to the processor 210, and may perform various data processing and calculations. The processor 210 may be implemented as, for example, a system on chip (SoC). According to an embodiment, the processor 210 may further include a graphics processing unit (GPU), an image signal processor, and/or a digital signal processor. The processor 210 may include at least some of the components illustrated in FIG. 2, for example, a cellular module 221. The processor 210 may load and process a command or data received from at least one of other components (for example, a nonvolatile memory) in a volatile memory, and store various pieces of data in the nonvolatile memory.

The communication module 220 may include, for example, the cellular module 221, a WiFi module 223, a Bluetooth module 225, a GNSS module 227 (for example, a GPS module, a Glonass module, a Beidou module, or a Galileo module), an NFC module 228, and a radio frequency (RF) module 229.

The memory 230 may include an internal memory 232 or an external memory 234. The internal memory 232 may include at least one of volatile memory (e.g., dynamic random access memory (DRAM), static RAM (SRAM), or synchronous dynamic RAM (SDRAM)), and a nonvolatile memory (e.g., one-time programmable read-only memory (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard drive, or a solid state drive (SSD)).

The external memory 234 may include a flash drive (e.g., a compact flash (CF), a secure digital (SD), micro-SD, mini-SD, xD, extreme digital (xD), a multi-media card (MMC), or a memory stick). The external memory 234 may be functionally and/or physically connected to the device 200 via any one of various interfaces.

The sensor module 240 may measure a physical amount or detect an operation state of the device 200, and convert measured or detected information to an electrical signal. For example, the sensor module 240 may include at least one of a gesture sensor 240A, a gyro sensor 240B, an atmosphere sensor 240C, a magnetic sensor 240D, an acceleration sensor 240E, a grip sensor 240F, a proximity sensor 240G, a color sensor 240H (e.g., an RGB sensor), a biometric sensor 240I, a temperature/humidity sensor 240J, an illumination sensor 240K, an electronic compass 240L, and an ultraviolet (UV) sensor 240M. The sensor module 240 may further include a control circuit for controlling at least one sensor therein. According to some embodiments, the device 200 may further include a processor configured to control the sensor module 240 as a part of or separately from the processor 210 to control the sensor module 240 while the processor 210 is in a sleep mode.

The input device 250 may include a touch panel 252, a (digital) pen sensor 254, a key 256, and an ultrasonic input device 258. The touch panel 252 may use at least one of a capacitive method, a resistive method, an infrared method, and an ultrasonic method. The touch panel 252 may further include a control circuit. The touch panel 252 may further include a tactile layer and thus may provide a tactile response to a user.

The (digital) pen sensor 254 may be, for example, a part of the touch panel, or may include a special recognition sheet. The key 256 may include, for example, a physical button, an optical key, or a keypad. The ultrasonic input device 258 may sense ultrasound waves generated by an input instrument and may check data corresponding to the sensed ultrasound waves, via a microphone (e.g., a microphone 288).

The display 260 may include a panel 262, a hologram device 264, or a projector 266. The panel 262 may be realized to be flexible, transparent, or wearable. The panel 262 may be configured as one module integrated with the touch panel 252.

The interface 270 may include an HDMI 272, a USB 274, an optical interface 276, or a D-subminiature (D-sub) 278.

The audio module 280 may bi-directionally convert sound and an electric signal. The audio module 280 may include a speaker 282, a receiver 284, earphones 286, or the microphone 288 to process input or output sound information.

The camera module 291 may be a device for capturing a still image and a video, and according to an embodiment, may include at least one imaging sensor (for example, a front sensor or a rear sensor), a lens, an image signal processor (ISP), or a flash (for example, an LED or a xenon lamp).

The power management module 297 may manage power of the device 200. According to an embodiment, the power management module 297 may include a power management integrated circuit (PMIC), a charger IC, or a battery or fuel gauge. The PMIC may use a wired and/or wireless charging method. The battery gauge may measure a remaining capacity of the battery 299, and a voltage, current, or temperature during charging of the battery 299.

The indicator 293 may display a state of the device 200 or a component of the device 200 (for example, the processor 210), such as a booting state, a message state, or a charging state. The motor 295 may convert an electric signal to a mechanical vibration, and may generate a vibration effect or a haptic effect.

Figure 3:
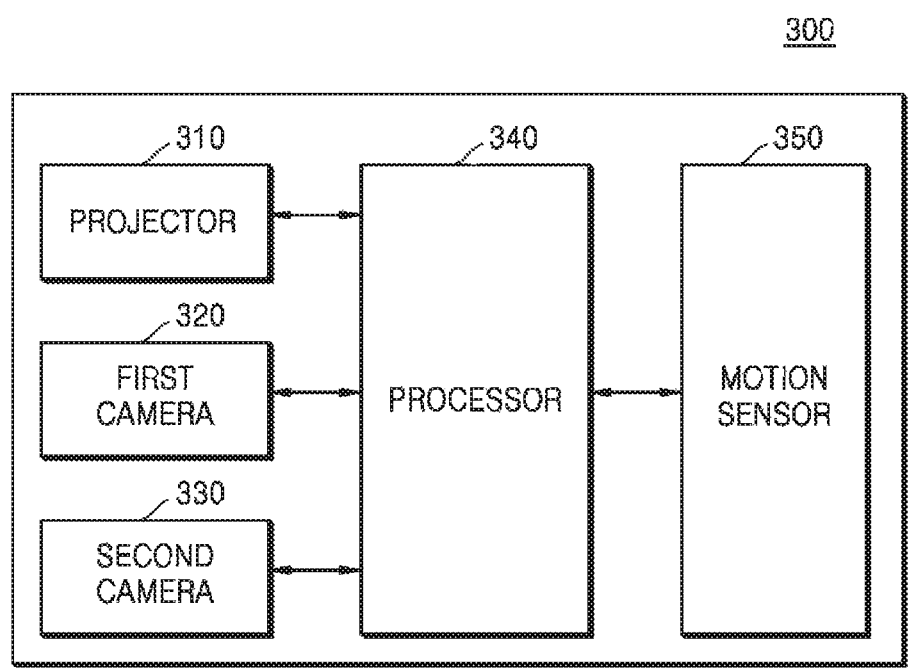
FIG. 3 illustrates a block diagram of a device for obtaining an image, according to another embodiment.

FIG. 3 illustrates a block diagram of a device 300 for obtaining an image, according to another embodiment.

The device 300 may include a projector 310, a first camera 320, a second camera 330, a processor 340, and a motion sensor 350. However, all of the illustrated components are not essential. The device 300 may be implemented by more or less components than those illustrated in FIG. 3.

The aforementioned components will now be described in detail.

The projector 310 may project light having a preset pattern (for example, structured light) onto an object. The light radiated by the projector 310 may be near-infrared light, but this is merely an embodiment. The light radiated by the projector 310 is not limited thereto. According to the present embodiment, the object may be a scene corresponding to a field of view set by the device 300 or may be an object positioned at the field of view.

The first camera 320 may sense light reflected and fed back by the object. The first camera 320 may obtain a depth image of the object, based on the sensed light. For example, the first camera 320 may analyze distortion of the pattern of light projected onto the object by the projector 310, from the sensed light, thereby obtaining a depth image including depth information that represents a distance between the object and the device 300.

The second camera 330 may obtain a color image of the object. For example, the second camera 330 may obtain a color image of the object that includes color information, such as an RGB (Red Green Blue) value of the object.

According to the present embodiment, the first camera 320 and the second camera 330 are separated from each other. However, according to another embodiment, the first camera 320 and the second camera 330 may be implemented as a single camera that obtains a depth image and a color image.

The processor 340 may change at least one of parameters about the light projected by the projector 310 and the light sensed by the first camera 320 to thereby obtain a plurality of depth images of the object. For example, the processor 340 may obtain a plurality of depth images having different brightnesses by changing at least one of an intensity with which light is projected, a time period during which light is projected, a time period during which reflected light is sensed, and a sensitivity with which reflected light is sensed.

When a motion of the device 300 sensed by the motion sensor 350 is less than a threshold, the processor 340 may merge pieces of depth information respectively obtained from the plurality of depth images. On the other hand, when the sensed motion of the device 300 is equal to or greater than the threshold, the processor 340 may re-obtain a plurality of depth images of the object via the projector 310 and the first camera 320. According to another embodiment, the processor 340 may select depth images obtained when the motion of the device 300 is less than the threshold from among the plurality of depth images, and may merge respective pieces of depth information of the selected depth images with each other. According to another embodiment, when the sensed motion of the device 300 is equal to or greater than the threshold, the processor 340 may merge the pieces of depth information respectively obtained from the plurality of depth images, based on motion information of the device 300. For example, the processor 340 may coordinate-transform depth values of the pixels included in at least one of the plurality of depth images according to the motion of the device 300, and may merge a coordinate-transformed depth value of the at least one depth image with depth values of the remaining depth images.

The processor 340 may obtain a 3D image of the object, based on merged depth information and the obtained color image. For example, the processor 340 may match a depth map generated based on the merged depth information with the color image to thereby determine a depth value of each of a plurality of pixels included in the color image. The processor 340 may determine a depth value of a first pixel of which a depth value has not yet been determined from among the plurality of pixels included in the color image, based on depth values of pixels adjacent to the first pixel.

According to an embodiment, the processor 340 may blur at least a portion of the 3D image of the object, based on the merged depth information and focus information set by the device 300. This will be described in greater detail below with reference to FIGS. 12, 13A, and 13B. According to another embodiment, the processor 340 may detect a region corresponding to a preset distance range from the 3D image of the object, based on the merged depth information. This will be described in greater detail below with reference to FIG. 14.

The motion sensor 350 may sense the motion of the device 300. For example, the motion sensor 350 may sense whether the device 300 rotated, shook, and shifted while obtaining a depth image. The motion sensor 350 may also obtain motion information representing at least one of a direction in which and a distance by which the device 300 moved. According to an embodiment, the motion sensor 350 may include at least one of an acceleration sensor, a gyroscope, and an electronic compass. However, this is only an embodiment, and the motion sensor 350 is not limited thereto.

Figure 4:
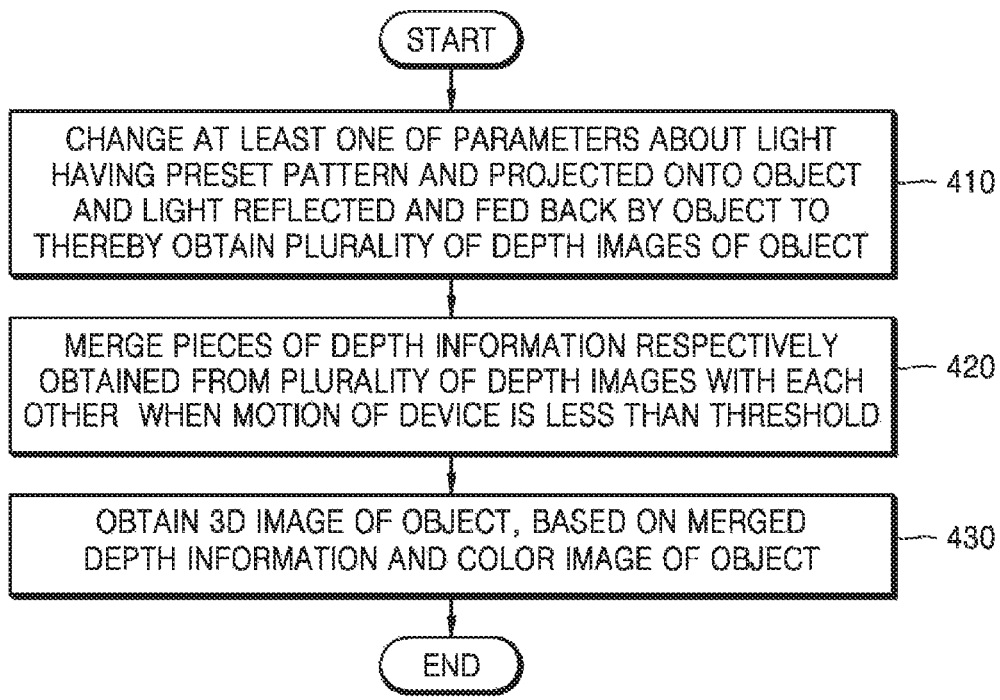
FIG. 4 illustrates a flowchart of a method in which a device according to an embodiment obtains an image.

FIG. 4 illustrates a flowchart of a method in which a device according to an embodiment obtains an image.

In operation 410, the device changes at least one of parameters about light having a preset pattern and projected onto an object and light reflected and fed back by the object to thereby obtain a plurality of depth images of the object.

According to an embodiment, the device may project the light having the preset pattern onto an object positioned within a field of view. As projected light is reflected by the object, the device may sense the light reflected and fed back by the object and calculate a degree of distortion of the shape of the pattern to thereby obtain a depth image of the object.

The device may obtain the plurality of depth images of the object while changing parameters, such as the intensity of light projected onto the object, the time period during which the light is output, and the sensitivity with which the light reflected and fed back by the object is sensed. As the device changes these parameters, the obtained plurality of depth images may have different brightnesses. This will be described in greater detail below with reference to FIGS. 5A-5C.

In operation 420, when a motion of the device is less than a threshold, the device may merge pieces of depth information respectively obtained from the plurality of depth images with each other.

According to an embodiment, the device may obtain the pieces of depth information from the plurality of depth images, respectively. As the plurality of depth images are obtained based on different parameter values, the plurality of depth images may include depth information of different regions. For example, a first depth image may include depth information of a region relatively close to the device, and a second depth image may include depth information of a region relatively far from the device.

According to an embodiment, when the motion of the device is less than the threshold, the device may merge the depth information included in the first depth image with the depth information included in the second depth image.

According to an embodiment, when the motion of the device is equal to or greater than the threshold, the device may re-obtain a plurality of depth images of the object. A method of re-obtaining the plurality of depth images may correspond to above-described operation 410. According to another embodiment, the device may select depth images obtained when the motion of the device is less than the threshold from among the plurality of depth images, and may merge only pieces of depth information of the selected depth images with each other. According to another embodiment, the device may coordinate-transform depth information of at least one of the plurality of depth images, based on motion information of the device, and may merge pieces of depth information of the plurality of depth images with each other.

In operation 430, the device may obtain a 3D image of the object, based on merged depth information and a color image of the object. For example, the device may match a depth map generated based on the merged depth information with the color image to thereby determine a depth value of each of a plurality of pixels included in the color image.

Figure 5A:
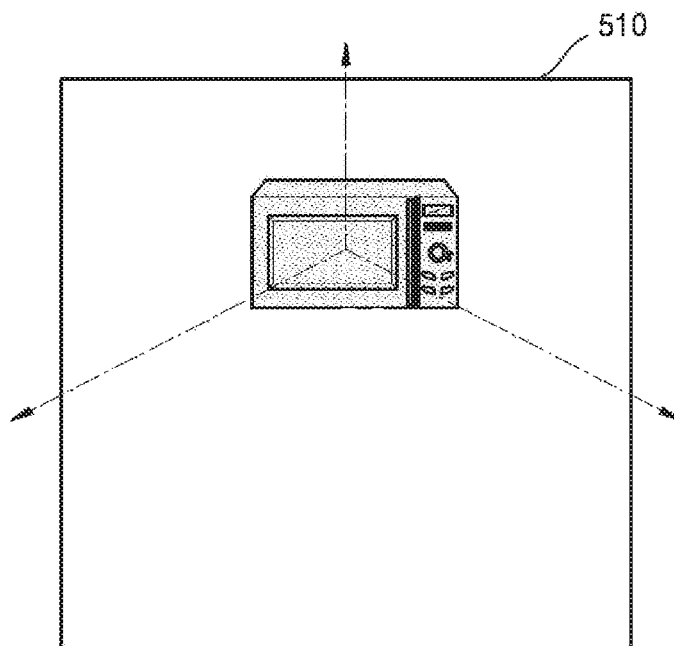
FIGS. 5A-5C are diagrams for explaining a method in which a device obtains a plurality of depth images of an object, according to an embodiment.
Figure 5B:
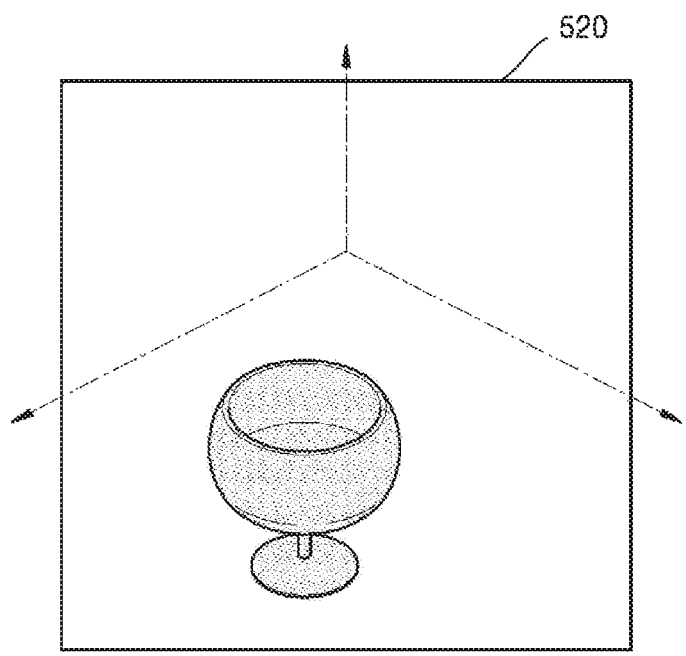
Figure 5C:
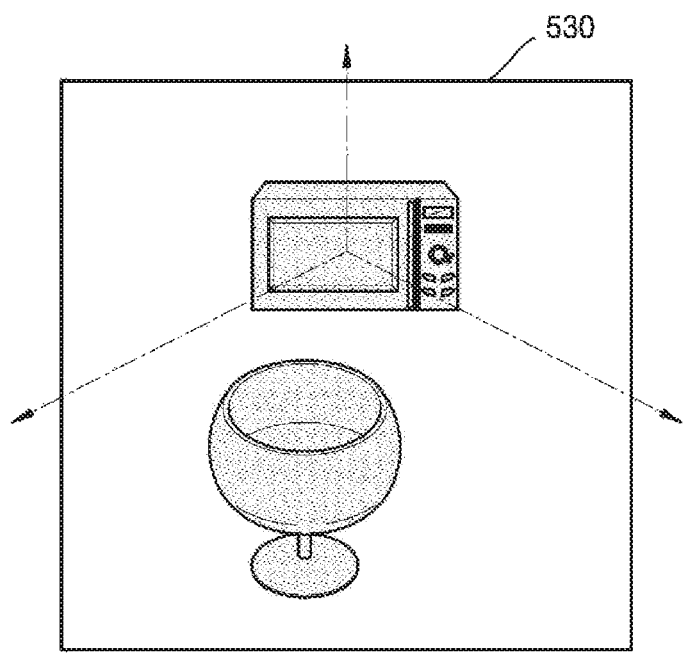

FIGS. 5A-5C are diagrams for explaining a method in which a device obtains a plurality of depth images of an object, according to an embodiment.

In the embodiment of FIGS. 5A-5C, it is assumed that a motion of the device is less than a threshold.

Referring to FIG. 5A, the device may obtain a first depth image 510 having a relatively high brightness by controlling parameters about light projected by a projector and light sensed by a first camera. For example, the device may obtain the first depth image 510 having a relatively high brightness by increasing the intensity of the light projected by the projector or increasing the time period during which the light is projected by the projector. According to another example, the device may obtain the first depth image 510 having a relatively high brightness by increasing the time period during which the light is sensed by the first camera or increasing the camera gain of the first camera. As the first depth image 510 is obtained at a high brightness, depth information of a region far from the device may be obtained.

Referring to FIG. 5B, the device may obtain a second depth image 520 having a relatively low brightness by controlling the parameters about the light projected by the projector and the light sensed by the first camera. For example, the device may obtain the second depth image 520 having a relatively low brightness by decreasing the intensity of the light projected by the projector or decreasing the time period during which the light is projected by the projector. According to another example, the device may obtain the second depth image 520 having a relatively low brightness by decreasing the time period during which the light is sensed by the first camera or decreasing the camera gain of the first camera. As the second depth image 520 is obtained at a low brightness, depth information of a region close to the device may be obtained.

Referring to FIG. 5C, the device may merge the depth information obtained from the first depth image 510 with the depth information obtained from the second depth image 520. As a motion of the device at the moment when the first depth image 510 and the second depth image 520 are obtained is less than the threshold, the device may simply merge the depth information included in the first depth image 510 with the depth information included in the second depth image 520. For example, depth information z1 of a pixel located at (x1, y1) in the first depth image 510 may be merged with depth information z2 of a pixel located at (x2, y2) in the second depth image 520 to thereby obtain a third depth image 530 including both the depth information of the first depth image 510 and the depth information of the second depth image 520.

According to an embodiment, the device may obtain depth images having different brightnesses and merge pieces of depth information respectively included in the depth images with each other, thereby increasing resolution with respect to depth information of the object.

FIGS. 6A-6D are graphs for explaining a motion sensed by a device according to an embodiment.

According to an embodiment, the device may determine whether a motion of the device is less than a threshold, thereby determining whether to merge respective pieces of depth information of a plurality of depth images with each other. The device may sense a motion thereof, such as shaking, rotation, and shifting. The motion of the device may be expressed with three directions of an x axis, a y axis, and a z axis. The motion of the device will now be described with reference to FIGS. 6A-6D. In the graphs of FIGS. 6A-6D, the x axis may represent a sample number of each of a plurality of depth images, and the y axis may represent motion values in x-axis, y-axis, and z-axis directions.

Figure 6A:
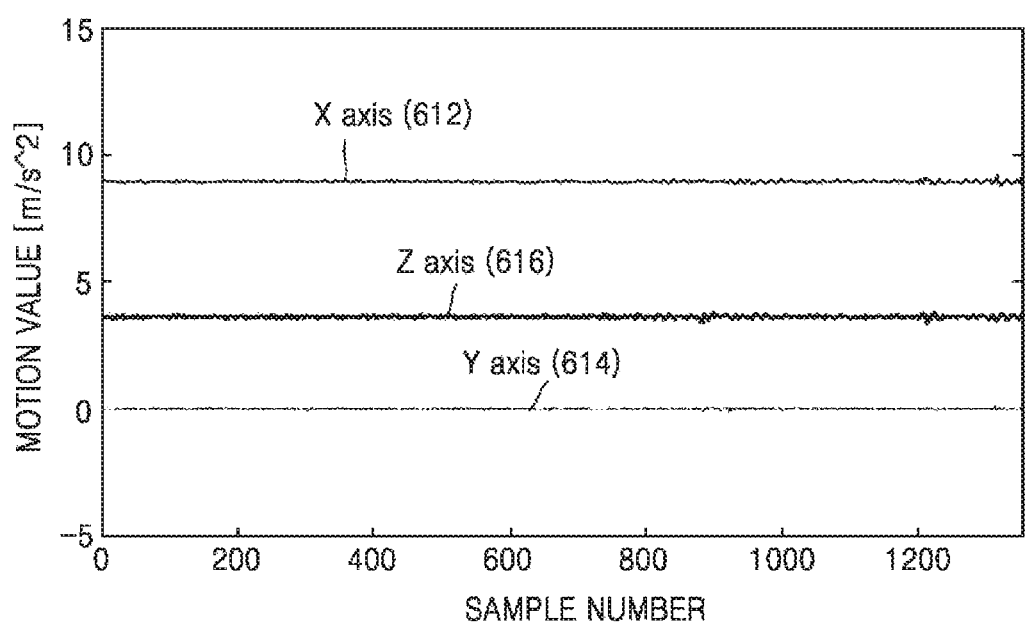
FIGS. 6A-6D are graphs for explaining a motion sensed by a device according to an embodiment.

Referring to FIG. 6A, the device may ascertain, via sensed motion information, that motion values 612, 614, and 616 of the plurality of depth images in the x-axis, y-axis, and z-axis directions are less than the threshold. For example, when the device is supported by a cradle, such as a tripod, motions of the plurality of depth images obtained by the device may be less than the threshold. As shown in FIG. 6A, when a motion of the device at the moment when the plurality of depth images are obtained is less than the threshold, the device may merge the pieces of depth information respectively obtained from the plurality of depth images with each other.

Figure 6B:
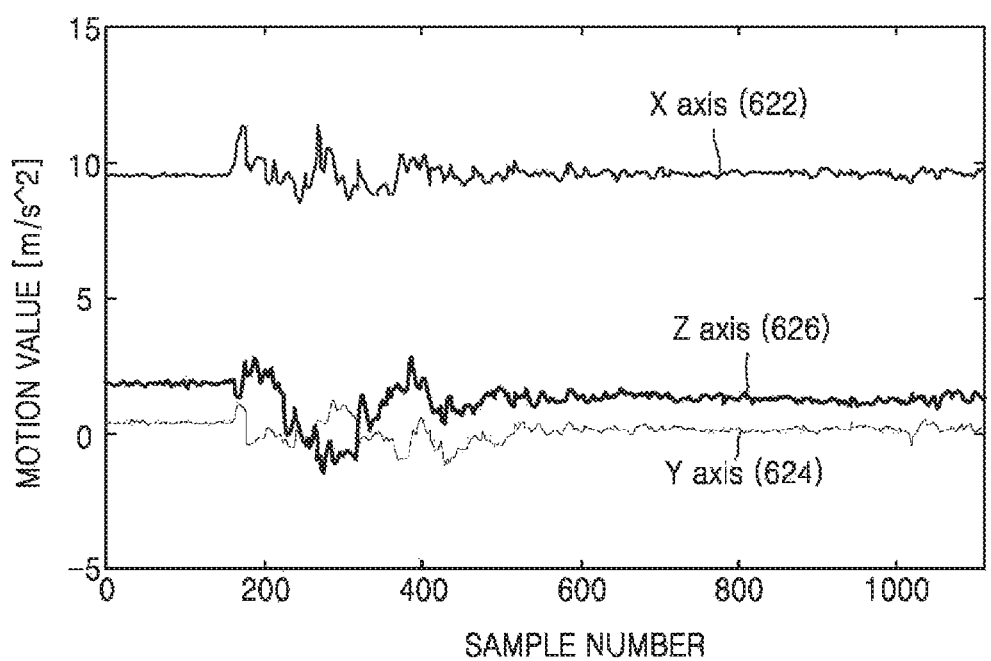

Referring to FIG. 6B, the device may ascertain, via sensed motion information, that motion values 622, 624, and 626 in the x-axis, y-axis, and z-axis directions of depth images obtained within a certain section (sample numbers 200-400) from among the plurality of depth images are equal to or greater than the threshold. For example, when a user obtains a depth image of an object while holding the device in his or her hand, a motion of the device, as shown in FIG. 6B, may be sensed. According to an embodiment, the device may select only depth images of which motion values are less than the threshold, from the plurality of depth images. The device may obtain pieces of depth information from the selected depth images, respectively, and may merge the obtained pieces of depth information with each other. According to another embodiment, the device may coordinate-transform depth information of a depth image of which a motion value is equal to or greater than the threshold, based on motion information of the device, and may merge respective pieces of depth information of the plurality of depth images with each other.

Figure 6C:
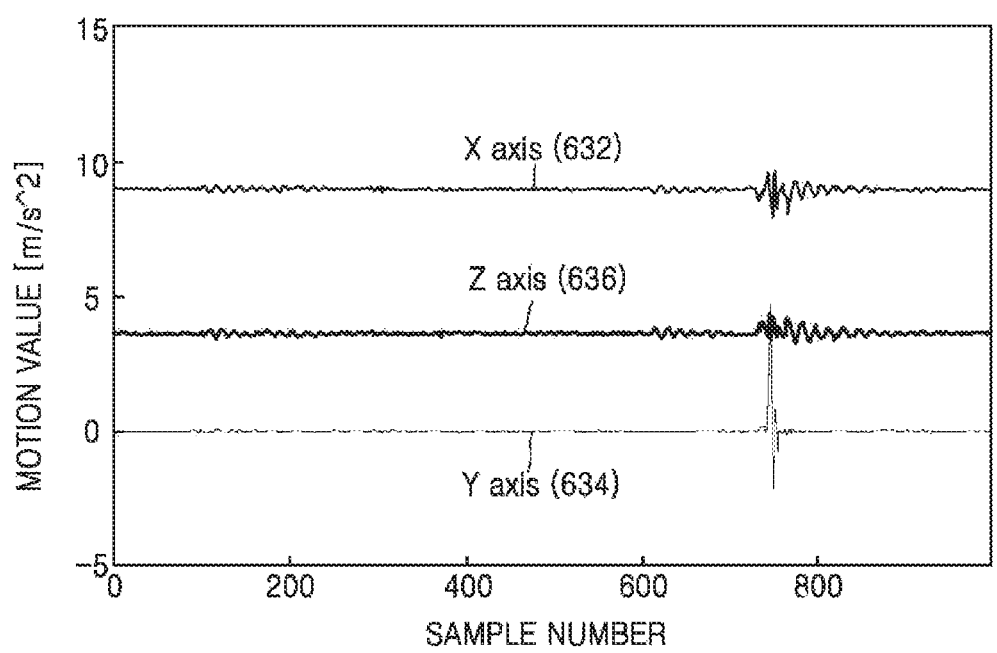

Referring to FIG. 6C, the device may ascertain, via sensed motion information, that motion values 632, 634, and 636 of a certain depth image in the x-axis, y-axis, and z-axis directions from among the plurality of depth images are equal to or greater than the threshold. The device may ascertain a time point when the device moved, via the sensed motion information. As described above with reference to FIG. 6B, the device may select only depth images of which motion values are less than the threshold from among the plurality of depth images, and may merge respective pieces of depth information of the selected depth images with each other.

Figure 6D:
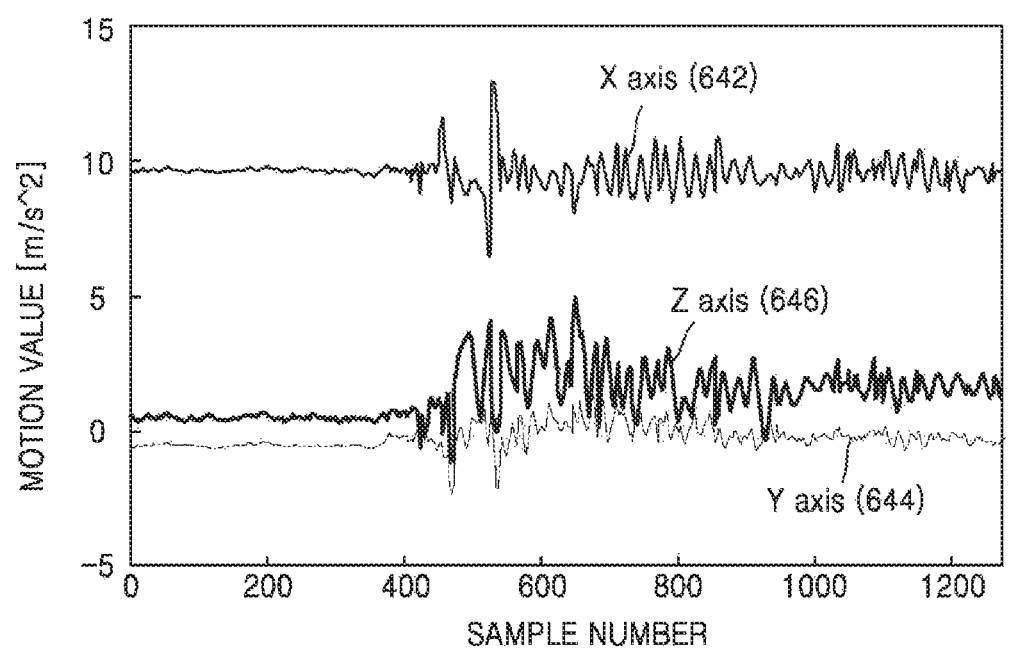

Referring to FIG. 6D, the device may ascertain, via sensed motion information, that motion values 642, 644, and 646 of most of the plurality of depth images in the x-axis, y-axis, and z-axis directions are equal to or greater than the threshold. Accordingly, according to an embodiment, the device may discard the obtained depth images and may re-obtain a plurality of depth images of the object. According to another embodiment, the device may coordinate-transform the respective pieces of depth information of the obtained plurality of depth images, based on motion information of the device, and may merge the pieces of depth information of the plurality of depth images with each other.

According to an embodiment, as described above with reference to FIGS. 6A-6D, the device may identify a motion type of the device, based on sensed motion information, and may determine a method of merging respective pieces of depth information of a plurality of depth images, according to the identified motion type of the device.

Figure 7:
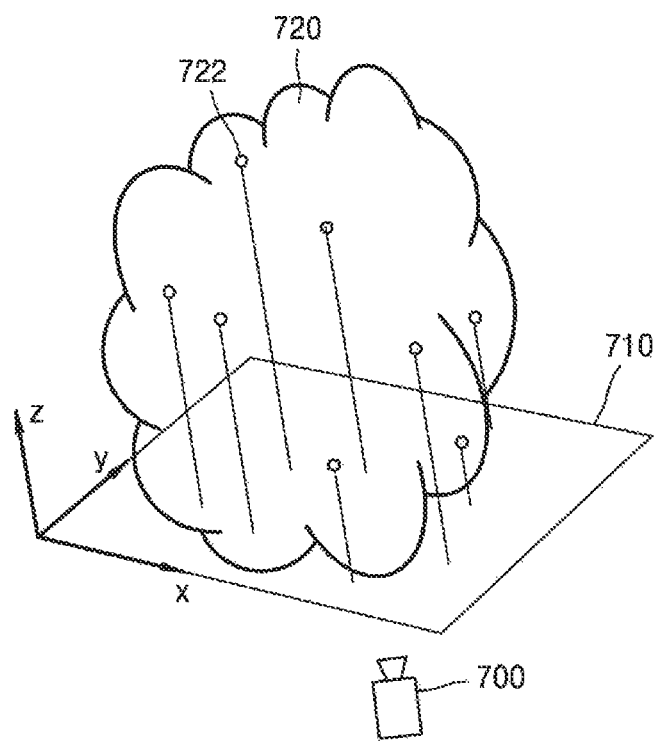
FIG. 7 illustrates a diagram for explaining a method in which a device according to an embodiment merges pieces of depth information respectively obtained from a plurality of depth images with each other, according to an embodiment.

FIG. 7 illustrates a diagram for explaining a method in which a device 700 according to an embodiment merges pieces of depth information respectively obtained from a plurality of depth images with each other, according to an embodiment.

According to an embodiment, the device 700 may project the pieces of depth information (point clouds) respectively obtained from the plurality of depth images onto a two-dimensional (2D) plane 710. The device 700 may project respective depth values of points on a space included in the plurality of depth images onto the 2D plane 710. For example, the device 700 may map the plurality of points on a space with corresponding x and y coordinates on the 2D plane 710. A gray value of a pixel corresponding to x and y coordinates on the 2D plane 710 may be expressed as a depth value of a point (for example, a point 722).

The device 700 may create a point cloud 720 having depth information, by analyzing distortion of a pattern. Thus, a point cloud on a space may be expressed by giving depth information to a gray-level value of each pixel corresponding to x and y coordinates on a 2D plane. However, this is only an embodiment, and a method of expressing depth values of pixels is not limited thereto.

Figure 8:
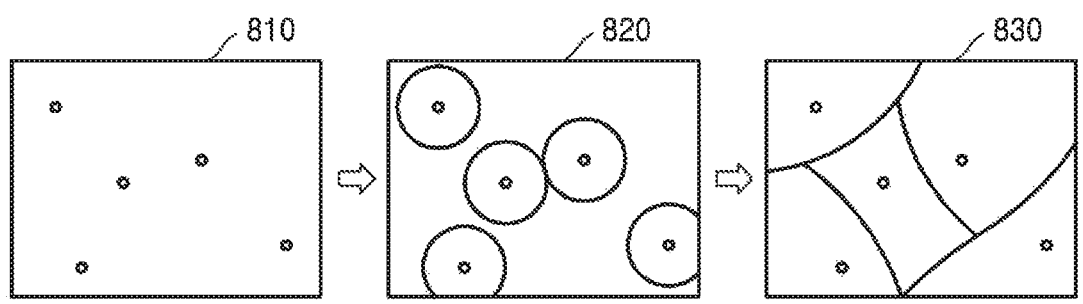
FIG. 8 illustrates a diagram for explaining a method in which a device according to an embodiment renders pieces of depth information respectively obtained from a plurality of depth images, according to an embodiment.

FIG. 8 illustrates a diagram for explaining a method in which a device according to an embodiment renders pieces of depth information respectively obtained from a plurality of depth images, according to an embodiment.

According to an embodiment, the device may merge the pieces of depth information respectively obtained from the plurality of depth images with each other. Merged depth information obtained by the merging may be expressed on a depth map that represents a distance between a view point of the device and an object surface.

FIG. 8 illustrates a process of interpolating depth values of pixels included in a depth map, based on the pieces of depth information respectively obtained from the plurality of depth images. It may be difficult to determine depth information of the entire area of an object by using only the pieces of depth information respectively obtained from the plurality of depth images. Accordingly, the device may sequentially determine a depth value of a pixel of which depth information has not yet been determined, by using depth values of pixels adjacent to the pixel.

For example, the device may interpolate depth values of certain pixels displayed on a first depth map 810 to thereby determine depth values of pixels adjacent to the certain pixels, as shown in a second depth map 820. The depth values of the certain pixels may be obtained from the pieces of depth information of the plurality of depth images. The device may also determine depth values of all of the pixels included in a depth map, as shown in a third depth map 830, by repeating the above-described interpolation.

According to another embodiment, the device may determine depth values of pixels of which depth information has not yet been obtained, by using a color image together with depth images, in order to increase the accuracy of interpolation. For example, after matching a color image and a depth map, the device may determine a relationship between the pixels included in the depth map by using edge information, a spatial gradient, and the like obtained from the color image. The device may interpolate a depth value of a pixel of which a depth value has not yet been determined, based on depth values of pixels adjacent to the pixel, by using the determined relationship between the pixels.

Figure 9:
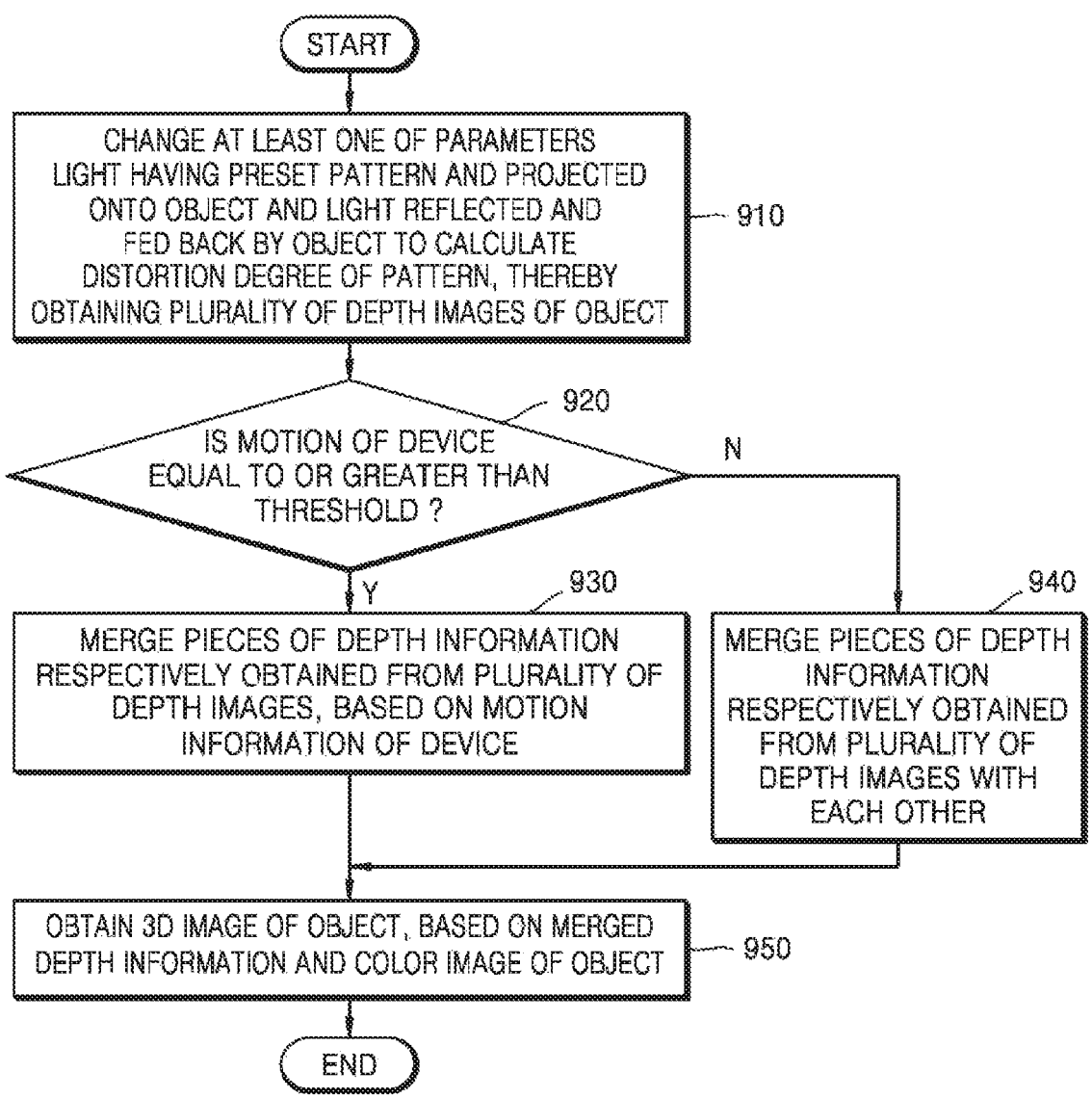
FIG. 9 illustrates a flowchart of a method in which a device according to an embodiment obtains depth information of an object from a plurality of depth images, based on motion information of the device, according to an embodiment.

FIG. 9 illustrates a flowchart of a method in which a device according to an embodiment obtains depth information of an object from a plurality of depth images, based on motion information of the device, according to an embodiment.

In operation 910, the device may change at least one of parameters about light having a preset pattern and projected onto the object and light reflected and fed back by the object to calculate a distortion degree of the pattern, thereby obtaining the plurality of depth images of the object.

Operation 910 may correspond to operation 410 described above with reference to FIG. 4.

In operation 920, the device may determine whether a motion of the device is equal to or greater than a threshold.

According to an embodiment, the device may sense the motion of the device by using a motion sensor. For example, the device may determine whether the device moved while obtaining a depth image, via sensors included in the device, such as an acceleration sensor, a gyroscope, and an electronic compass.

The device may also determine motion information about a rotation angle of the device, a shaking degree thereof, and a moving location and a moving direction thereof. For example, the device may determine the rotation angle or the like of the device by using the gyroscope and may determine a moving speed of the device and the shaking degree thereof by using the acceleration sensor. The moving direction of the device may be determined using the electronic compass.

According to another embodiment, the device may sense the motion of the device from a plurality of color images respectively matched with the plurality of depth images. For example, the device may compare the shapes or the like of the object included in the color images with each other, and sense the motion of the device, based on a difference between object shapes included in a series of color images. The device may determine the motion information from a difference between locations of edges or the like of the object included in the color images. However, because the motion information obtained based on the difference between the object shapes included in the color images is normalized, it may be difficult to check an actual motion value. To address this problem, the device may determine motion information representing a direction in which and a distance by which the device actually moved, by scaling the difference between the locations of the edges or the like of the object obtained from the color images by using the pieces of depth information respectively obtained from the plurality of depth images.

According to another embodiment, the device may increase the accuracy of the motion information of the device by using both the motion information obtained by the motion sensor and the motion information obtained from the plurality of color images respectively matched with the plurality of depth images.

The device may previously store a threshold of a motion which is a basis for determining whether the respective pieces of depth information of the plurality of depth images may be merged with each other. As the motion information of the device is determined, the device may determine whether the motion of the device is equal to or greater than the threshold, based on the determined motion information.

In operation 930, the device may merge the pieces of depth information respectively obtained from the plurality of depth images, based on the motion information of the device.

According to an embodiment, the device may transform the coordinate of at least one of a first depth image and a second depth image included in the plurality of depth images, based on the motion information. For example, the device may coordinate-transform depth values of the pixels included in the second depth image, based on rotation information and shifting information included in the motion information.

The device may merge depth information of a depth image obtained by coordinate-transforming the second depth image with depth information of the first depth image. This will be described in greater detail below with reference to FIG. 11.

In operation 940, the device may merge the pieces of depth information respectively obtained from the plurality of depth images with each other.

According to an embodiment, when the motion of the device is less than the threshold, the device may simply merge the pieces of depth information respectively included in the plurality of depth images with each other.

In operation 950, the device may obtain a 3D image of the object, based on merged depth information and a color image of the object.

For example, the device may match a depth map generated based on the merged depth information with the color image to thereby determine a depth value of each of a plurality of pixels included in the color image.

Figure 10:
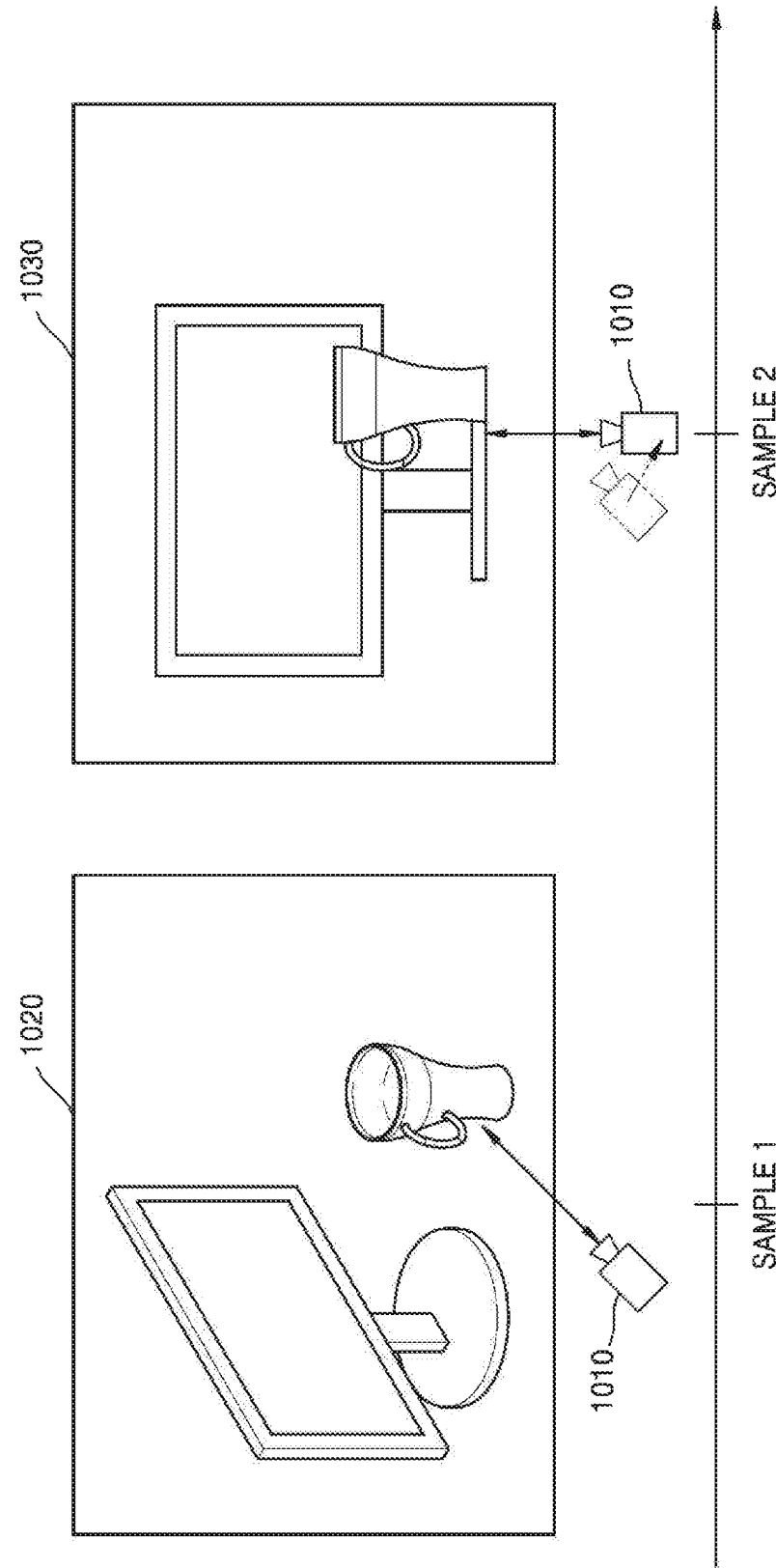
FIG. 10 illustrates a diagram for explaining a method in which a device according to an embodiment obtains motion information from a series of color images, according to an embodiment.

FIG. 10 illustrates a diagram for explaining a method in which a device 1010 according to an embodiment obtains motion information from a series of color images, according to an embodiment.

Referring to FIG. 10, it is assumed that a first depth image 1020 corresponding to a sample 1 from among a plurality of images obtained by the device 1010 is obtained when the device 1010 is at a first location and that a second depth image 1030 corresponding to a sample 2 from among the plurality of images obtained by the device 1010 is obtained when the device 1010 is at a second location.

The device 1010 may obtain motion information of the device 1010 by comparing the edges or the like of an object obtained from the series of color images with each other. For example, the device 1010 may ascertain that the device 1010 moved to the right by 135°, by comparing the edges or the like of an object obtained from the series of color images with each other.

According to an embodiment, as the motion information of the device 1010 is obtained from the series of color images, the device 1010 may transform the coordinates of some of depth images respectively corresponding to the series of color images, based on the obtained motion information. This will now be described in greater detail with reference to FIG. 11.

Figure 11:
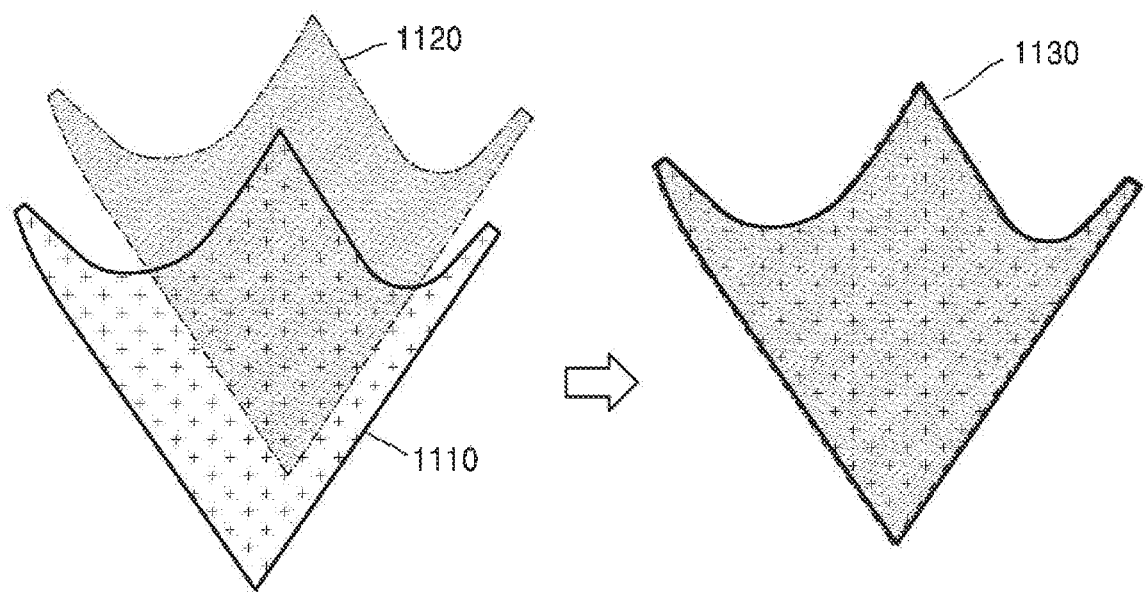
FIG. 11 illustrates a diagram for explaining a method in which a device according to an embodiment merges respective pieces of depth information of a plurality of depth images with each other when a motion of the device is equal to or greater than a threshold, according to an embodiment.

FIG. 11 illustrates a diagram for explaining a method in which a device according to an embodiment merges respective pieces of depth information of a plurality of depth images with each other when a motion of the device is equal to or greater than a threshold, according to an embodiment.

Referring to FIG. 11, according to an embodiment, the device may respectively obtain first depth information 1110 and second depth information 1120 from a first depth image and a second depth image corresponding to the plurality of depth images of FIG. 10.

In other words, the device may obtain new depth information on a coordinate system of second depth information by transforming first depth information by using a rotation matrix and a translation matrix obtained via the motion information in FIG. 10, and may obtain depth information with an increased resolution by merging the first depth information and the second depth information with each other.

As the motion of the device is equal to or greater than the threshold, the device may transform at least one of the first depth information 1110 and the second depth information 1120 and may merge depth information of the first depth image with depth information of the second depth image. For example, the device may transform the coordinate of the second depth information 1120, based on motion information obtained based on the plurality of color images.

The device may merge coordinate-transformed second depth information 1120 with the first depth information 1110 to thereby obtain third depth information 1130 having higher resolution than the first depth information and the second depth information.

It is recommended to express, in FIG. 11, that the number of points in the image of the third depth information 1130 increased so that two point clouds are merged into a new point cloud image having high resolution.

Figure 12:
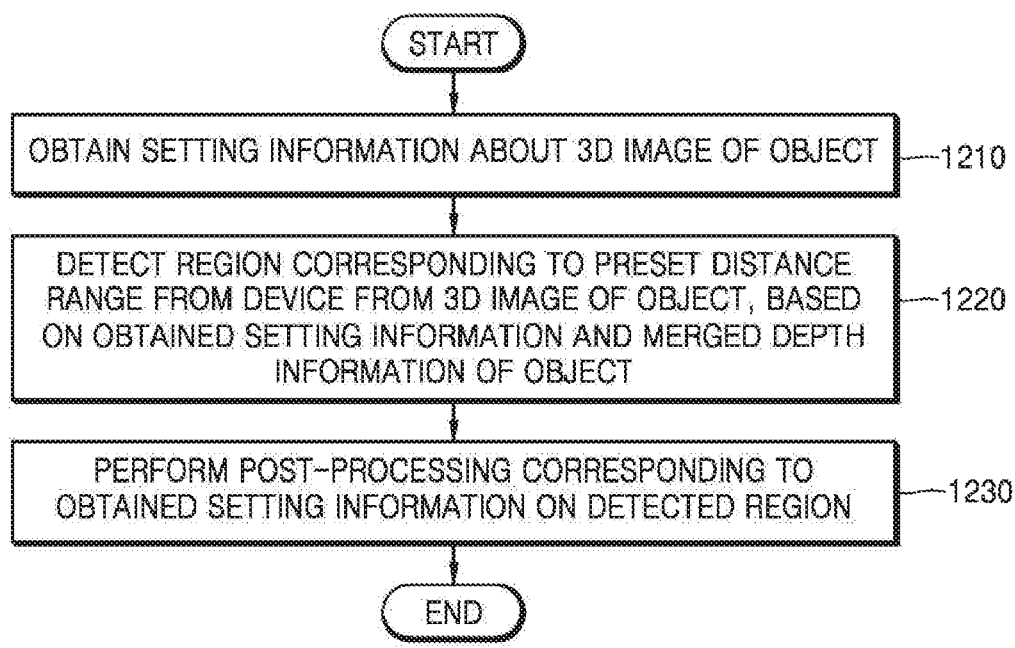
FIG. 12 illustrates a flowchart of a method in which a device according to an embodiment performs post-processing on a three-dimensional (3D) image of an object, based on depth information of the object, according to obtained setting information, according to an embodiment.

FIG. 12 illustrates a flowchart of a method in which a device according to an embodiment performs post-processing on a 3D image of an object, based on depth information of the object, according to obtained setting information, according to an embodiment.

In operation 1210, the device may obtain setting information about the 3D image of the object. The setting information about the 3D image of the object may represent the type of post-processing performed on the 3D image. The post-processing is image processing for giving a special effect to a 3D image, and may be blurring, blue-boxing, or the like. However, this is merely an embodiment, and post-processing that may be performed by the device is not limited thereto. For example, the post-processing may include a process for showing an image effect according to a focal length, the aperture of a lens on a 3D image.

In operation 1220, the device may detect a region corresponding to a preset distance range from the device from the 3D image of the object, based on the obtained setting information and merged depth information of the object.

According to an embodiment, the device may store the merged depth information of the object. The merged depth information of the object may represent a depth map generated by merging pieces of depth information included in a plurality of depth images of the object with each other, as described above with reference to FIG. 4.

The device may determine the type of post-processing to be performed, based on the obtained setting information. According to the determined type of post-processing, the device may detect a specific region of the 3D image of the object to which the post-processing is to be applied. For example, when the post-processing is blurring of a remote region, the device may detect the remote region from the 3D image of the object. According to another embodiment, when the post-processing is blue-boxing, the device may detect a region at a certain distance to undergo blue-boxing, from the 3D image of the object.

In operation 1230, the device may perform post-processing corresponding to the obtained setting information on the detected region.

According to an embodiment, the device may perform post-processing, such as blurring or blue-boxing, on the detected region, thereby giving an effect according to setting information to the 3D image of the object.

Figure 13A:
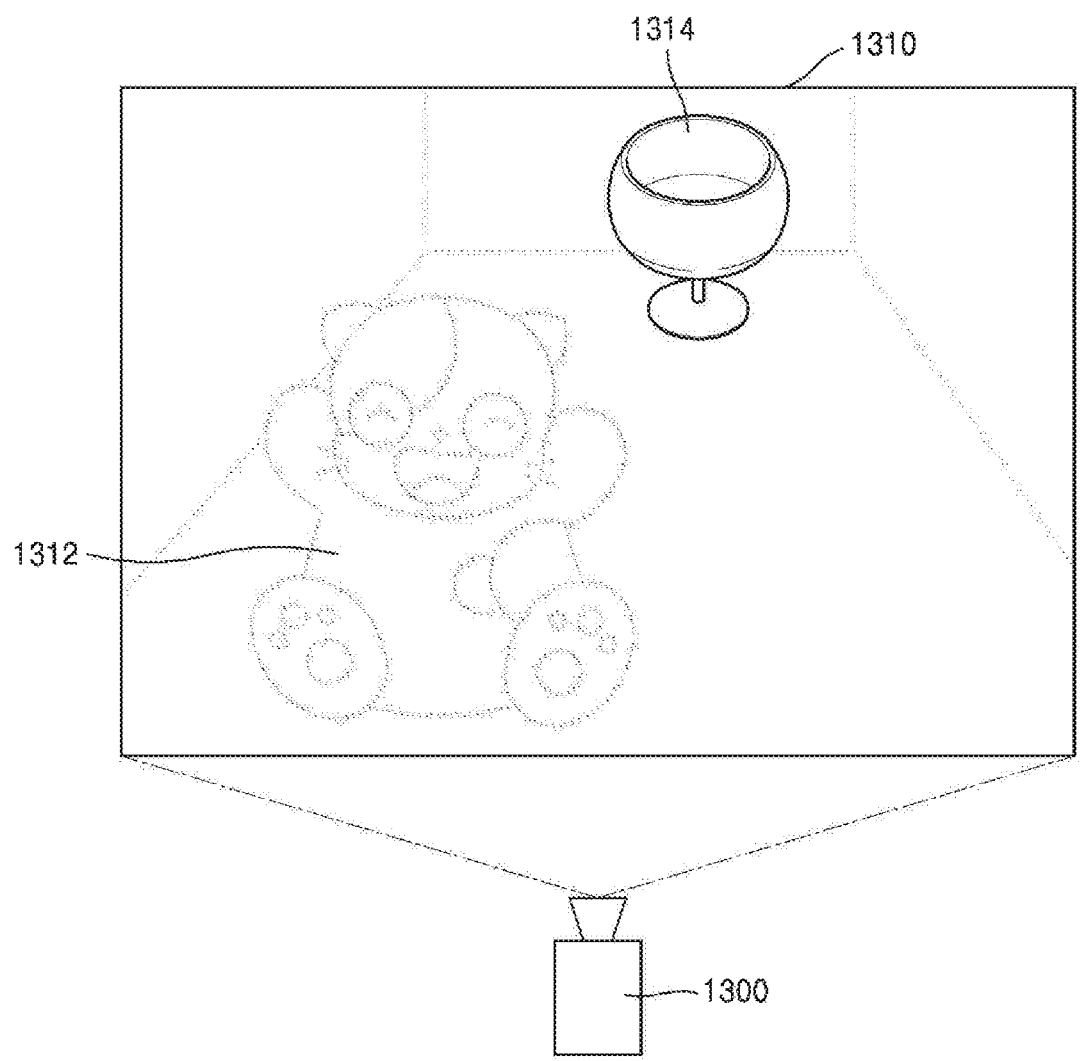
FIGS. 13A and 13B are diagrams for explaining a method in which a device according to an embodiment performs post-processing on a 3D image of an object, based on depth information of the object, according to obtained setting information.
Figure 13B:
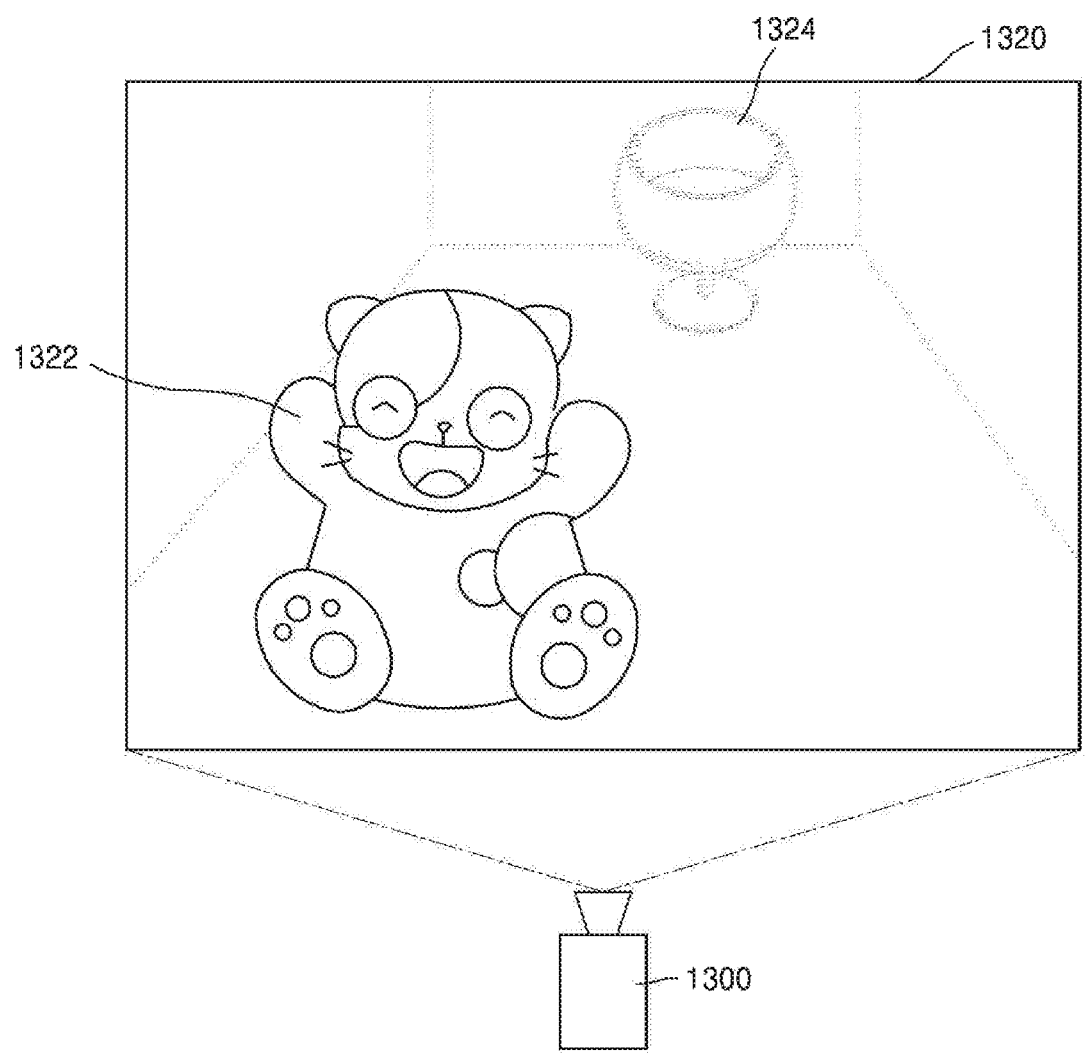

FIGS. 13A and 13B are diagrams for explaining a method in which a device 1300 according to an embodiment performs post-processing on a 3D image of an object, based on depth information of the object, according to obtained setting information.

According to an embodiment, the device 1300 may perform post-processing on the 3D image of the object, based on the obtained setting information, according to the above-described method.

Referring to FIG. 13A, the device 1300 may determine the type of post-processing corresponding to the obtained setting information to be blurring of a region at a short distance from the device 1300, via the aperture of a lens, a focal length, and blurring information included in the obtained setting information.

Accordingly, the device 1300 may perform blurring on a first region 1312 of the 3D image of the object that is located at a relatively short distance from the device 1300, based on depth information of the object. As a result of performing the post-processing, the device 1300 may obtain a 3D image of the object in which the first region 1312 at a short distance is blurred and a second region 1314 at a remote distance is not blurred.

Referring to FIG. 13B, the device 1300 may determine the type of post-processing corresponding to the obtained setting information to be blurring of a region at a remote distance from the device 1300, via the aperture of a lens, a focal length, and blurring information included in the obtained setting information.

Accordingly, the device 1300 may perform blurring on a second region 1324 of the 3D image of the object that is located at a relatively remote distance from the device 1300, based on depth information of the object. As a result of performing the post-processing, the device 1300 may obtain a 3D image 1320 of the object in which the second region 1324 at a remote distance is blurred and a first region 1322 at a short distance is not blurred.

Figure 14:
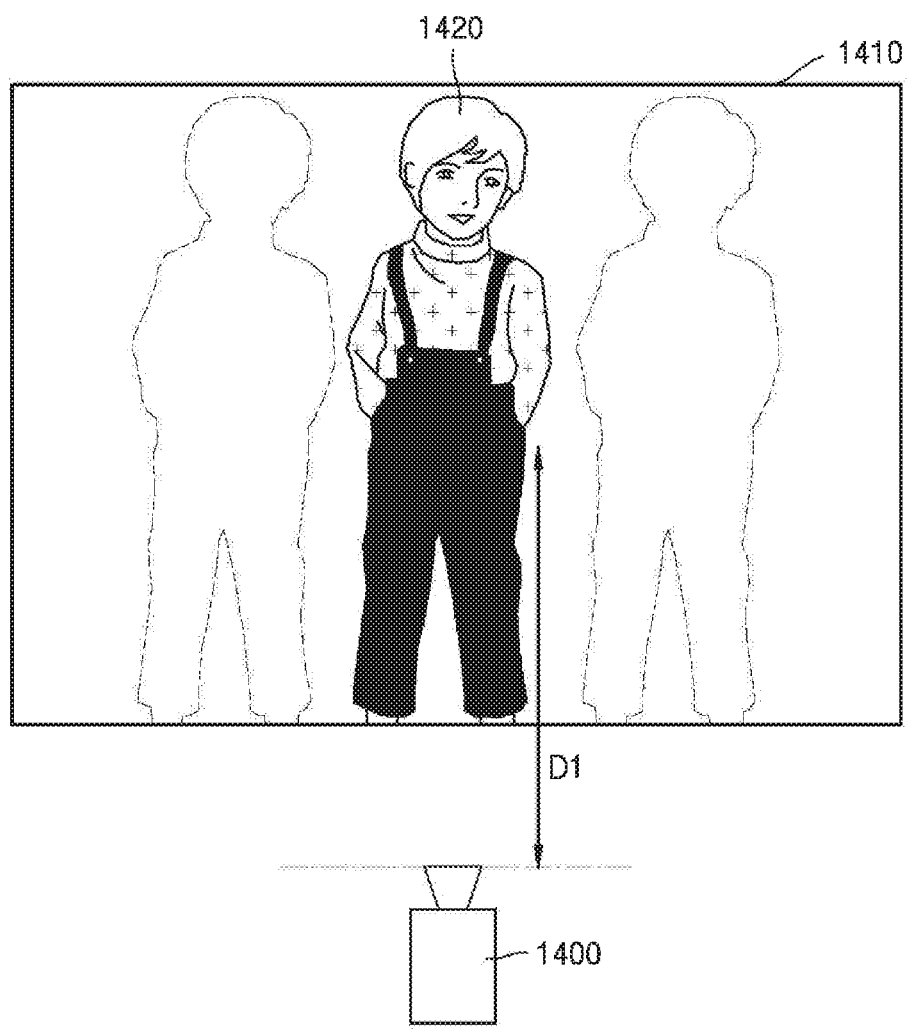
FIG. 14 illustrates a diagram for explaining a method in which a device according to another embodiment performs post-processing on a 3D image of an object, based on depth information of the object, according to obtained setting information.

FIG. 14 illustrates a diagram for explaining a method in which a device 1400 according to another embodiment performs post-processing on a 3D image of an object, based on depth information of the object, according to obtained setting information.

Referring to FIG. 14, the device 1400 may determine the type of post-processing corresponding to the obtained setting information to be blue-boxing on a region corresponding to a distance D1 from the device 1400, via the obtained setting information.

Accordingly, the device 1400 may detect a region 1420 corresponding to the distance D1 from a 3D image 1410 of an object, based on depth information of the object. The device 1400 may remove an image of a region other than the detected region 1420 to thereby perform post-processing based on setting information on the 3D image 1410 of the object.

According to an embodiment, a device may obtain a 3D image of an object by merging pieces of depth information respectively obtained from a plurality of different depth images, thereby providing a 3D image having increased resolution on an X-Y plane and in a Z-axis direction.

Each of technical components herein may be configured as one or more components, and a name of the component may differ according to a type of an electronic device. According to various embodiments, the electronic device may include at least one of the aforementioned components. Some of the aforementioned components may be omitted, or other components may be further included in addition to the aforementioned components. Some of the components of an electronic device according to various embodiments are merged into a single entity, and the single entity may still perform the functions of the components not yet merged.

The present invention may be implemented by storing computer-readable code in a computer-readable recording medium. The computer-readable recording medium is any type of storing device that stores data which can thereafter be read by a computer system.

The computer-readable code is configured to perform the operations of a photographing apparatus controlling method according to the present invention when the computer-readable code is read from the computer-readable recording medium and executed by a processor. The computer-readable code may be implemented with any programming language. Also, functional programs, codes, and code segments for accomplishing embodiments of the present invention can be easily construed by one of ordinary skill in the art to which the present invention pertains.

Examples of the computer-readable recording medium include ROM, RAM, CD-ROMs, magnetic tape, floppy discs, and optical data storage media. The computer-readable recording medium can also be distributed over network-coupled computer systems so that the computer-readable code is stored and executed in a distributive manner.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A device for obtaining an image, the device comprising:
a projector configured to project light comprising a preset pattern to an object;
a first camera configured to sense the light that is reflected off of the object to obtain a plurality of depth images;
a second camera configured to obtain a color image of the object;
a motion sensor configured to sense a motion of the device; and
a processor configured to:
determine a plurality of different parameter values for projecting the light and sensing the light,
obtain the color image and the plurality of depth images of the object by projecting the light and sensing the light based on the each of the plurality of different parameter values,
when the motion of the device is less than a threshold, merge pieces of depth information obtained from the plurality of depth images that include depth information from different regions of the object that are various distances from the first camera, and
obtain a three-dimensional (3D) image of the object, based on the merged pieces of depth information and the color image.

2. The device of claim 1, wherein:
the processor is configured to obtain the plurality of depth images of the object by changing at least one of:
an intensity that the light is projected,
a first time period that the light is projected,
a second time period that the light is sensed, or
a sensitivity that the light is sensed; and
to merge the pieces of depth information increases resolution of the object.

3. The device of claim 1, wherein the processor is configured to:
select at least one depth image, from the plurality of depth images, obtained when the motion of the device is less than the threshold, and
merge the pieces of depth information of the at least one depth image with each other.

4. The device of claim 1, wherein the processor is configured to determine depth values of a plurality of pixels included in the color image, based on the merged pieces of depth information.

5. The device of claim 4, wherein to determine a depth values the processor is configured to determine a first depth value of a first pixel included in the color image, of which the first depth value has not yet been determined, based on adjacent depth values of pixels that are adjacent to the first pixel.

6. A method of obtaining an image in a device, the method comprising:
determining a plurality of different parameter values for projecting light and sensing the light comprising a preset pattern;
projecting the light onto an object by changing the light based on the plurality of different parameter values;
sensing the light that is reflected off of the object to obtain a plurality of depth images of the object;
sensing a motion of the device;
when the motion of the device is less than a threshold, merging pieces of depth information obtained from the plurality of depth images that include depth information from different regions of the object that are various distances from a camera; and
obtaining a 3D image of the object, based on the merged pieces of depth information and a color image of the object.

7. The method of claim 6, wherein:
obtaining the plurality of depth images comprises changing at least one of:
an intensity that the light is projected,
a first time period for projecting the light,
a second time period for sensing the light, or
a sensitivity for sensing the light; and
merging the pieces of depth information increases resolution of the object.

8. The method of claim 6, further comprising selecting at least one depth image, from the plurality of depth images, obtained when the motion of the device is less than the threshold,
wherein merging the pieces of depth information comprises merging the pieces of depth information of the at least one depth images with each other.

9. The method of claim 6, wherein obtaining the 3D image comprises determining depth values of a plurality of pixels included in the color image, based on the merged pieces of depth information.

10. The method of claim 9, wherein determining the depth values of the plurality of pixels comprises determining a first depth value of a first pixel included in the color image, of which the first depth value has not yet been determined, based on adjacent depth values of pixels that are adjacent to the first pixel.

11. A non-transitory storage medium comprising a program, for obtaining an image on an electronic device, the program comprising program code that, when executed by at least one processor of the electronic device, causes the electronic device to:

determine a plurality of different parameter values for projecting light and sensing the light comprising a preset pattern;

project the light onto an object by changing the light based on the plurality of different parameter values;

sense the light that is reflected off of the object to obtain a plurality of depth images of the object;

sense a motion of the electronic device;

when the motion of the electronic device is less than a threshold, merge pieces of depth information obtained from the plurality of depth images that include depth information from different regions of the object that are various distances from a camera; and obtain a 3D image of the object, based on the merged pieces of depth information and a color image of the object.

12. The program code of claim 11, wherein:

to obtain the plurality of depth images, the program code that, when executed by the at least one processor of the electronic device, causes the electronic device to obtain the plurality of depth images of the object by changing at least one of:

an intensity that the light is projected, a first time period for projecting the light, a second time period for sensing the light, or a sensitivity for sensing the light; and to merge the pieces of depth information increases resolution of the object.

* * * * *